United States Patent
Marlow et al.

(10) Patent No.: US 7,008,698 B2
(45) Date of Patent: Mar. 7, 2006

(54) PROPANE DIOL-BASED POLYESTER RESIN AND SHRINK FILM

(75) Inventors: Chadwick E. Marlow, Kingsport, TN (US); Charles D. Carlson, Jr., Falls Church, VA (US); Robert G. Posey, Duncan, SC (US); Gary R. Garner, Greer, SC (US); Russell S. Foxhall, Lyman, SC (US)

(73) Assignee: Mitsubishi Polyester Film, LLC, Greer, SC (US)

( * ) Notice: Subject to any disclaimer, the term of this patent is extended or adjusted under 35 U.S.C. 154(b) by 45 days.

(21) Appl. No.: 10/866,897

(22) Filed: Jun. 14, 2004

(65) Prior Publication Data

US 2005/0163986 A1 Jul. 28, 2005

Related U.S. Application Data

(60) Provisional application No. 60/479,037, filed on Jun. 17, 2003.

(51) Int. Cl.
*B32B 27/06* (2006.01)
*B32B 27/18* (2006.01)
*B32B 27/30* (2006.01)
*B32B 27/36* (2006.01)
*B32B 31/16* (2006.01)

(52) U.S. Cl. .................... 428/480; 428/34.9; 428/35.1; 428/337; 428/339; 428/910; 264/288.4; 264/289.3; 264/290.2; 525/165; 525/173; 525/437; 525/444; 528/308; 528/308.6; 528/308.7

(58) Field of Classification Search ..................... None
See application file for complete search history.

(56) References Cited

U.S. PATENT DOCUMENTS

| | | | | |
|---|---|---|---|---|
| 4,381,379 A | * | 4/1983 | Toga et al. | 525/444 |
| 4,996,291 A | * | 2/1991 | Yoshinaka et al. | 528/272 |
| 6,270,866 B1 | * | 8/2001 | Okuda et al. | 428/35.1 |
| 6,342,281 B1 | * | 1/2002 | Hayakawa et al. | 428/35.2 |
| 6,413,596 B1 | * | 7/2002 | Okuda et al. | 428/34.7 |
| 6,565,985 B1 | * | 5/2003 | Ueyama et al. | 428/474.4 |
| 6,599,994 B1 | * | 7/2003 | Shelby et al. | 525/444 |
| 6,699,549 B1 | * | 3/2004 | Ueyama et al. | 428/36.7 |
| 2001/0014729 A1 | * | 8/2001 | Hayakawa et al. | 528/272 |
| 2002/0061412 A1 | * | 5/2002 | Ueyama et al. | 428/475.8 |
| 2003/0088033 A1 | * | 5/2003 | Shelby et al. | 525/444 |

* cited by examiner

*Primary Examiner*—Vivian Chen

(74) *Attorney, Agent, or Firm*—Dority & Manning, P.A.

(57) ABSTRACT

A shrinkable polymer film including a modified polyester resin polymerized from monomers including a dicarboxylic acid and a glycol, wherein the glycol includes 2-methyl-1, 3-propanediol, and wherein the polymer film shrinks at least about 50% in a main shrinkage direction after ten seconds in an 80 degree Celsius hot water bath.

35 Claims, No Drawings

PROPANE DIOL-BASED POLYESTER RESIN AND SHRINK FILM

This Application claims benefit from Provisional Application No. 60/479,037, filed Jun. 17, 2003.

BACKGROUND OF THE INVENTION

1. Field of the Invention

The present invention relates generally to a 2-methyl-1,3-propanediol-based polyester film having substantial shrink properties, and the polyester resin from which the film is formed. More specifically, it is related to a modified polyethylene terephthalate in which 2-methyl-1,3-propanediol is partially substituted for ethylene glycol. The degree of shrinkage and the degree of crystallinity in the resulting film can be varied and controlled by varying the relative amounts of 2-methyl-1,3-propanediol in the resin and film.

2. Description of Related Art

Shrink films are known in the art. Such films are useful for many applications, including shrink-to-fit labels for bottles and other dimensional items. Polyester-based shrink films are particularly advantageous for use on polyester containers, as they facilitate the recycling process by allowing polyester containers to be reclaimed along with their polyester labels without introducing incompatible resins into the recycling stream.

When shrink films are used in labeling applications, they are typically printed with text, images and the like. Thus, it is preferred that shrink films be printable, either directly, or through compatibility with print adhesion promoting coatings or treatments. For many applications, the shrink film is preferably clear or transparent. It is preferably durable under normal packaging, transport and storage conditions. The film should optimally be cost effective to manufacture, and should minimize the use of organic solvents or other potentially environmentally hazardous compounds in its manufacture and use, to the extent possible. Films adapted for in-line coating application are also desirable. A film providing a combination of these benefits is desirable.

Known shrink films include films based on PVC (poly (vinyl chloride)), oriented polystyrene, as well as more environmentally sensitive modified copolyesters such as PETG (1,4-cyclohexanedimethanol modified poly(ethylene terephthalate)). These films provide excellent shrink properties and provide good strength and consistent appearance. However, more cost-effective alternatives to PETG-based and other known shrink film resins are desirable. In addition, shrink film resins that are more conducive to recycling, and that can be processed with fewer modifications on conventional PET film manufacturing equipment are also desired.

Certain diol-based polyester resins have been suggested for use in shrink films. See, e.g., U.S. Pat. No. 4,996,291 to Yoshinaka et al. However, the numerous propanediols disclosed in the Yoshinaka et al. patent do not include the structurally simpler 2-methyl-1,3-propanediol, and instead are all more highly branched propanediol-containing copolymers using monomers such as 2-methyl, 2-ethyl-1,3-propanediol and 2-methyl-2-propyl-1,3-propanediol. The utility of 2-methyl-1,3-propanediol was clearly not appreciated, and in fact expressly discounted through omission by Yoshinaka et al. from an otherwise extensive list of propanediols. Moreover, no commercial film embodying the teachings of the Yoshinaka et al. patent is known to be available, suggesting technical limitations and other difficulties in utilizing the diols listed therein to create desirable shrink films.

BRIEF SUMMARY OF THE INVENTION

Accordingly, it is an object of the present invention to provide a polyester shrink film that has excellent shrink properties.

It is a further object of the present invention to provide a shrink film with readily adjustable shrink properties.

It is another object of the present invention to provide a shrink film that is economical to manufacture.

It is yet another object of the present invention to provide a shrink film that, depending on processing conditions, can also be used for conventional film end uses.

It is another object of the present invention to provide a shrink film that crystallizes slowly.

The present invention provides a modified polyethylene terephthalate in which 2-methyl-1,3-propanediol is partially substituted for ethylene glycol. The degree of shrinkage and the degree of crystallinity in the resulting film can be varied and controlled by varying the relative amounts of 2-methyl-1,3-propanediol in the resin and film.

DETAILED DESCRIPTION OF THE INVENTION 1,3-propane diol-modified polyesters are typically known to crystallize easily. Similarly, 1,3-propane diol-modified polymers can act to accelerate crystallization in compounds to which they are added. This would seem to suggest they would not function in any way as shrink enhancing agents. However, a substitution on the middle carbon can act to retard crystallization. Thus, propanediols with such substitutions have been suggested to have potential as shrink enhancing agents.

The present inventors have surprisingly found that excellent shrink film properties are provided by a polyester resin in which 2-methyl-1,3-propanediol is substituted in part for ethylene glycol. Given the fact that 2-methyl-1,3-propanediol-based copolyesters are less branched than known propanediol-based copolyesters suggested for use in shrink films, it would be believed that it would not have sufficient shrink properties. Nonetheless, it has been found that 2-methyl-1,3-propanediol modified polyesters have excellent, and in some cases superior, shrink properties, when compared to known shrink films. It can also be noted that conventional shrink additives are typically based on benzene-ring structures. However, the present 2-methyl-1,3-propanediol is a straight chain with a methyl group.

The propanediol preferred for use in the present invention is 2-methyl-1,3-propanediol, a preferred single substitution propanediol. A preferred 2-methyl-1,3-propanediol is commercially available from Lyondell Chemical Company under the tradename MP Diol. 2-methyl-1,3-propanediol-modified polyester has a viable glass transition temperature ($T_g$) for film manufacture. Modified polyesters having a $T_g$ that is too low can be sticky at room temperature, which is undesirable for most film applications. More highly branched diols can result in such lower $T_g$. Such polyesters may be hard to polymerize, resulting in a sticky, unusable or less effective product of polymerization. Such polyesters can also be vulnerable to unintended shrinkage during high temperatures encountered during storage or transportation, thus rendering such films untenable for many end uses and customers. Low amounts of such diols may be used to minimize these problems and maintain a higher $T_g$. However, in such cases the levels that are viable may be insufficient to produce desired shrink properties. Preferred $T_g$ ranges are from about 50 to about 72 degrees Celsius, alternately about 55 to about 65 degrees Celsius, further about 60 to about 63 degrees Celsius.

2-methyl-1,3-propanediol-modified polyesters have been found to have high enough $T_g$s to avoid such problems, even at higher relative concentrations of 2-methyl-1,3-propanediol. At target concentrations of approximately 35 mol % 2-methyl-1,3-propanediol, the 2-methyl-1,3-propanediol-modified polyester is essentially non-crystallizable, and fully amorphous. More highly branched diols may also result in fully amorphous polyesters at such concentrations, but are likely to result in unusable or less effective polyesters, as discussed above.

2-methyl-1,3-propanediol-modified polyesters have also been found to exhibit surprising heat seal properties, sealing effectively to themselves and various other surfaces at conventional heat seal temperatures. When the heat seal is formed, preferably heat of about 90 to about 170 degrees Celsius is applied, for a duration of about 0.5 to about 10 seconds (90 degrees Celsius applied for 5 seconds with a pressure of 40 pounds per square inch is a reference application used for testing purposes). Pressure of about 20 to about 60 psi (typically 40 psi) can be applied during this period, either along with or instead of the heat. Seal testing is typically performed on self-seals—wherein the coated film is sealed to itself. The force necessary to separate the film faces along the seam, or the force at which the film around the seal fails, is then measured and quantified. Typically, a 3 mil film is used for such bond testing. A force of about 4 pounds per square inch is then applied.

The 2-methyl-1,3-propanediol is preferably incorporated into a polyester resin as a partial substitution for ethylene glycol during polymerization. A typical polyester resin is formulated employing 100 mol percent ethylene glycol. According to the present invention, high shrink properties are obtained at a surprisingly low concentration of 2-methyl-1,3-propanediol, relative to known concentrations of shrink additives. 2-methyl-1,3-propanediol is preferably present at about 5 to about 50 mol %, alternately at about 10 to about 35 mol %, of the resulting modified polyester resin, with about 20 to about 30 mol % being preferred. Ethylene glycol, other glycols (as discussed below) or combinations thereof are typically used to make up the remaining glycol.

Thus, when 2-methyl-1,3-propanediol is substituted for ethylene glycol at greater than about 10 mol %, the resulting films typically become increasingly amorphous and exhibit high shrinkage upon reheating. High shrinkage is defined as shrinkage of more than about 50% shrinkage in the main shrinking direction. Shrinkage is determined herein (except where noted) utilizing a hot water bath at 80 degrees Celsius (also at 99 degrees Celsius where noted). The sample is measured in all dimensions and submerged in the bath for ten seconds. Final dimensions are then measured, and the degree of shrinkage is quantified from the measurements.

Higher relative mol percents of 2-methyl-1,3-propanediol can be used, up to and including 100 mol percent. It has been noted that under conventional polymerization conditions, a reactivity issue can occur at about 44–45 mol % 2-methyl-1,3-propanediol, which renders it very difficult to achieve a usable molecular weight. It has been noted that 2-methyl-1,3-propanediol-modified polyesters are less sensitive to the relative amount of diol than more highly branched diol-based polyesters. Such more highly branched diol-based polyesters are limited to low diol concentrations, as discussed above. Their shrink properties change more dramatically with small changes in diol concentration, rendering them more difficult to formulate, process and control. 2-methyl-1,3-propanediol-modified polyesters, on the other hand, have shrink properties that change more gradually with adjusting diol concentration, and thus give more flexibility in formulating and processing.

A preferred process for forming a base film is set forth in U.S. Pat. No. 5,350,601 to Culbertson et al., incorporated herein by reference. Polycondensation of the diol and/or glycol with a dicarboxylic acid (or its ester equivalents) such as terephthalic acid, isophthalic acid, sebacic acid, malonic, adipic, azelaic, glutaric, suberic, succinic acids and the like, or mixtures of two or more of the foregoing, are preferred for use in the present invention. Suitable glycols include ethylene glycol, diethylene glycol, polyethylene glycol, and polyols such as butanediol and the like. Mixtures of two or more of the foregoing are also suitable.

Films having shrinkage of less than about 50% can be used in some of the same markets as other low shrink, specialty polyester films. Films having shrinkage of more than about 50% are preferred for traditional shrink film markets, including markets for shrinkable packaging labels. Preferred shrinkages ranges in a main direction for such embodiments range from about 50 to about 80% (considered full return), alternately about 60 to about 80%, alternately about 70 to about 80%, alternately about 75% to about 80%.

Preferred resins according to the present invention have advantageous properties. For example, 2-methyl-1,3-propanediol-based resins are less viscous than commercially available shrink-film resins, including PETG-based resins. Consequently, 2-methyl-1,3-propanediol-based resins can be run more easily and with fewer adjustments on standard polyester film resin processing equipment. In addition, the reduced viscosity results in additional benefits such as less shear heating, longer filter life, and less streaking.

Conventional additives that are known in the art can be included in the films of the present invention. For example, pigments, other colorants, stabilizers (including but not limited to UV stabilizers), antistatic agents, adhesion promoters, antioxidants, delusterants, fillers, plasticizers, slip agents, and the like can be included in the films of the present invention.

Shrink properties of the films of the present invention vary depending on the relative amounts of 2-methyl-1,3-propanediol used in the resin. For example, a high shrinkage film having shrinkage in the main shrinking direction of about 78% or greater at 80 degrees Celsius can be formed. Conventional films with minimal shrink can also be formulated using resins of the present invention. Such formulating flexibility is valuable in developing compatible product lines. For preferred films of the present invention, maximum shrink is typically reached at less than about 80 degrees Celsius, making it easier to run the film faster or at lower temperatures during the shrinking process. At 0 mol % 2-methyl-1,3-propanediol (conventional PET), the resulting film has essentially no shrink properties. At 35 mol %, a resulting film has approximately 100% recovery, thus signifying that it will return on heating to essentially the same dimensions as the film had prior to transverse direction stretch.

Preferred films of the present invention are believed to have good impact resistance properties, due to increased elongation-to-break properties resulting from high amorphousness. Preferred films of the present invention are also less costly than known shrink films. The 2-methyl-1,3-propanediol is less expensive than available propanediols. Moreover, the excellent shrink properties of the present invention can be achieved at relatively low amounts of 2-methyl-1,3-propanediol, thus rendering the resulting film less expensive than films requiring higher relative amounts of diol or other shrink-inducing components.

Thus, a preferred polyester is the condensation product of the following monomers or their polyester forming equivalent: terephthalic acid, 2-methyl-1,3-propanediol, and equivalent mol percents of ethylene glycol. An optimal copolyester is made up of about 100 mol percent terephthalic acid, varying mol percent of 2-methyl-1,3-propanediol, depending on desired shrink properties, and the remainder ethylene glycol.

The polyester shrink resin of the present invention is preferably used as the sole or primary polyester resin used in forming the polyester film. In an alternate preferred embodiment, a blend with polyester and/or non-polyester resins is possible. Blends allow the easy adjustment of a base resin to achieve desired 2-methyl-1,3-propanediol levels (transesterification during the melt would result in a reduction of the effective 2-methyl-1,3-propanediol level (e.g. a blend of half 35 mol %-modified polyester and half unmodified polyester would be equivalent to a resin of 17.5 mol %-modified polyester)). Blends with PETG, PEN, polystyrene, and various other resins are possible to adjust properties of the resulting film.

The resulting films have excellent clarity and freedom from streaking. This is important for many packaging applications in which the enclosed product or another packaging element is visible through the film.

Conventional coatings can be used on the films of the present invention, including but not limited to adhesion promoting coatings, surface modifiers, print adhesion enhancers, antistatic and antiblock coatings, matte finish coatings, heat seal and barrier coatings. It is preferred that any coatings used be aqueous, to avoid plasticizing the surface (as solvent coatings can do) and for environmental and processing safety reasons.

Film thickness can vary depending on application. Preferred film thicknesses for labeling and various other end uses are about 10 microns to about 200 microns, alternatively about 25 microns to about 100 microns.

The reclaim (no excessive yellowing or deterioration in physical properties when coated film scrap is mixed with fresh polymer and re-extruded) and recycling characteristics of a polymer film are important. The ability to reuse scrap film, instead of disposing of it, reduces material and waste disposal costs and minimizes unnecessary waste. It has been found that the preferred films of the present invention have excellent reclaim characteristics.

In addition, the polymer film may be a polymer laminate. Such laminates include polymer-polymer laminates like polyester-polyolefin or polyester-adhesive-polyolefin, polymer-metallic laminates such as polyester-aluminum, or polymer-paper or polymer-adhesive-paper laminates. Coated polymer films or film laminates can also be used. Primer coatings used to enhance wet-out or coating adhesion are preferred examples of such coatings.

The films may be produced by any well known technique in the art. For example, polyester is typically melted and extruded as an amorphous sheet onto a polished revolving casting drum to form a cast sheet of the polymer. The sheet is quickly cooled and then stretch oriented in one or more directions to impart strength, toughness and the desired shrink properties to the film. The sheet is typically stretched from about two to about ten times, alternately about four to about seven times the original cast sheet dimension, in one or both directions. Monoaxial orientation is most preferred, with biaxial orientation being less preferred. Orientation in the transverse direction is preferred.

Generally, stretching occurs in a temperature range from about the second order transition temperature of the polymer to below the temperature at which the polymer softens and melts. Where necessary, the film is heat treated after stretching to "lock-in" the properties by annealing the film to a degree, typically for semi-crystalline lower 2-methyl-1,3-propanediol content films or where 2-methyl-1,3-propanediol is added as a property modifier. This step, when used, tends to impart dimensional stability and good tensile properties to the film. Such heat treatment for polyester film is generally conducted at about 190° C. to about 240° C. Such temperatures are preferred for higher 2-methyl-1,3-propanediol concentration films. Lower temperatures of about 80 to about 100 degrees Celsius are preferred for low concentration 2-methyl-1,3-propanediol films. For typical high shrink films according to the present invention, however, such heat treatment will not be used.

While surface modification of the polymer film is not required, it has been found that better results are obtained if the surface or surfaces of the polymer film are modified before application of any coatings that may be desired. Conventional surface modification techniques include corona treatment, which is the most common and most preferred procedure for modifying the surface of the polymer base film to enhance coating adhesion. The corona treatment or other surface modification should be sufficient to permit wetting out of the coating. Corona treatment of about 1.0 watt per square foot per minute is typically sufficient to achieve the desired results. In addition, primer or other intermediate layers can optionally be used between the polymer film and a coating layer.

EXAMPLES

Modified PET samples were formed according to the chart below. Uniaxial orientation of the samples was performed, resulting in a draw ratio of approximately 5:1 in the tested portions. For these samples, heat was applied using a hot air gun. The surprisingly enhanced shrinkages at both temperatures, and particularly at 80 degrees Celsius, are shown for the MP Diol sample in comparison with other known diols.

| | | | % Shrinkage | |
| --- | --- | --- | --- | --- |
| Sample | Modifier | Mol % | 80 deg. C. | 99 deg. C. |
| 1 | MP-Diol | 27.3 | 50.0 | 70.5 |
| C2 | Neopentyl glycol | 21.6 | 8.8 | 16.0 |
| C3 | 2,2-diethyl-1,3-propanediol | 27.2 | 24.2 | 50.0 |
| C4 | 2-butyl-2-ethyl-propanediol | 23.6 | 18.5 | 54.8 |

The present invention having been thus described with particular reference to the preferred forms and embodiments thereof, it will be obvious that various changes and modifications may be made therein without departing from the spirit and scope of the invention as defined in the appended embodiments.

What is claimed is:
1. A shrinkable polymer film comprising:
   a modified polyester resin polymerized from monomers including a dicarboxylic acid and a glycol, wherein the glycol includes 2-methyl-1,3-propanediol, and wherein the polymer film shrinks at least about 50% in a main shrinkage direction after ten seconds in an 80 degree Celsius hot water bath.

2. A label including the polymer film of claim 1.

3. The polymer film of claim 1, wherein the polymer film is transparent.

4. The polymer film of claim 1, wherein the polyester resin has a glass transition temperature that is sufficiently high to render the polymer film resistant to shrinkage at temperatures normally experienced during shipping.

5. The polymer film of claim 1, wherein the polyester resin has a glass transition temperature that is sufficiently high to render the polymer film non-sticky at room temperature.

6. The polymer film of claim 1, wherein the polymer film has heat seal properties sufficient to seal the polymer film to itself under heat seal conditions of 90 degrees Celsius applied for 5 seconds with a pressure of 40 pounds per square inch.

7. The polymer film of claim 1, wherein the 2-methyl-1,3-propanediol is present in the polyester resin at about 5 to about 50 mol percent.

8. The polymer film of claim 1, wherein the 2-methyl-1,3-propanediol is present in the polyester resin at about 10 to about 35 mol percent.

9. The polymer film of claim 1, wherein the 2-methyl-1,3-propanediol is present in the polyester resin at about 20 to about 30 mol percent.

10. The polymer film of claim 1, wherein the 2-methyl-1,3-propanediol is present in the polyester resin at more than about 10 mol percent.

11. The polymer film of claim 1, wherein the 2-methyl-1,3-propanediol is present in the polyester resin at about 50 to about 100 mol percent.

12. The polymer film of claim 1, wherein the polymer film has a shrinkage in a main shrinking direction of at least about 50%.

13. The polymer film of claim 1, wherein the polymer film has a shrinkage in a main shrinking direction of about 50% to about 80%.

14. The polymer film of claim 1, wherein the polymer film has a shrinkage in a main shrinking direction of about 70% to about 80%.

15. The polymer film of claim 1, wherein the glycol includes ethylene glycol.

16. The polymer film of claim 1, wherein the glycol includes ethylene glycol and an additional glycol.

17. The polymer film of claim 1, wherein the dicarboxylic acid includes terephthalic acid.

18. The polymer film of claim 1, wherein the polymer film further includes an additional resin.

19. The polymer film of claim 18, wherein the additional resin is PETG.

20. The polymer film of claim 18, wherein the additional resin is polyethylene naphthalate.

21. The polymer film of claim 18, wherein the additional resin is polystyrene.

22. The polymer film of claim 1, further including a coating on the polymer film.

23. The polymer film of claim 22, wherein the coating is aqueous.

24. The polymer film of claim 1, wherein the polymer film has a thickness of about 10 to about 200 microns.

25. The polymer film of claim 1, wherein the polymer film has a thickness of about 25 to about 100 microns.

26. The polymer film of claim 1, wherein the polyester resin has a glass transition temperature of about 50 to about 72 degrees Celsius.

27. The polymer film of claim 1, wherein the polyester resin has a glass transition temperature of about 55 to about 65 degrees Celsius.

28. A method of forming a polymer film comprising the step of:
    extruding a modified polyester resin polymerized from monomers including a dicarboxylic acid and a glycol, wherein the glycol includes 2-methyl-1,3-propanediol, to form the polyester film,
    wherein the polymer film shrinks at least about 50% in a main shrinkage direction after ten seconds in an 80 degree Celsius hot water bath.

29. The method of claim 28, further including the step of applying a coating to the polymer film in-line during film manufacture.

30. The method of claim 28, further including the step of applying heat to the polymer film during manufacture.

31. The method of claim 28, further including the step of applying heat to the polymer film after manufacture to achieve shrinkage.

32. The method of claim 31, wherein maximum shrinkage is reached at less than about 80 degrees Celsius.

33. The method of claim 28, further including the step of orienting the polyester film in at least one direction.

34. The method of claim 33, wherein the polymer film is stretched from about two to about ten times in a main stretching direction.

35. The method of claim 33, wherein the polymer film is stretched from about four to about seven times in a main stretching direction.

* * * * *